Patented July 14, 1953

2,645,671

UNITED STATES PATENT OFFICE 2,645,671

STILBENE FROM BENZYL MERCAPTAN

Leonard A. Mattano, Hammond, Ind., assignor to Standard Oil Company, Chicago, Ill., a corporation of Indiana No Drawing. Application June 20, 1951, Serial No. 232,663

8 Claims. (Cl. 260—668)

This invention relates to the manufacture of stilbene (diphenyl ethylene) and derivatives thereof. A major object of the invention is the provision of a process for the synthesis of stilbene and derivatives thereof having substituents on the benzene rings. Another object of the invention is the provision of a process for the synthesis of stilbene and its derivatives from sulfur compounds readily derived from petroleum products.

I have found that stilbene and its derivatives can be obtained by heating, to at least 150° C. and preferably to standard boiling temperature or above, a benzyl mercaptan having the formula

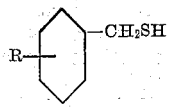

in which R can be hydrogen, or an alkyl or alkoxy group, in the presence of a sulfactive catalyst comprising one or more of the sulfides, polysulfides or oxides of the metals molybdenum, cobalt, iron, silver, copper, manganese, nickel and lead. The catalyst can be brought into contact with the mercaptan as a salt or oxide of the metal, in which case it will be converted to the sulfide in the reaction zone. Sulfactive catalysts are described in Lazier et al., U. S. 2,221,804.

Benzyl mercaptans can be made from benzyl chloride or ring-substituted benzyl chlorides by sulphydrolysis (Loverde U. S. 2,456,588), or from benzaldehyde, hydrogen and sulfur, reacted in the presence of iron sulfide (Farlow et al., U. S. 2,402,615).

Hydrogen sulfide is liberated during the course of reaction and is expelled from the synthesis system. The mercaptan reactant vapors liberated from the boiling reaction mass are condensed and the condensate is refluxed to the reaction zone. Preferably, an inert gas is passed through the reaction mass and is employed to strip reaction product and carry it therefrom to a condensing zone. Suitable stripping gases are nitrogen, carbon dioxide and ammonia. The liberated hydrogen sulfide will also aid in stripping the reaction product.

When the reaction is carried out at atmospheric pressure the initial reaction temperature will usually be the refluxing temperature, between about 190° and 200° C. of benzyl mercaptan at this pressure. An inert gas is used to strip lighter boiling by-products, such as toluene, from the reaction mixture during the reaction. The refluxing temperature will increase during the course of reaction and, at atmospheric pressure, will approach the boiling temperature of stilbene, or about 300° C. The refluxing can be carried out at low pressures and temperatures; an initial temperature of at least about 150° C. will be adequate to initiate the synthesis. Temperatures considerably in excess of 300° C. for example, temperatures above 325° C., will cause the process to encounter side reactions resulting in undesirable decomposition of the benzyl mercaptan. When the preparation is carried out under atmospheric pressure, a reaction period from about one-half to three hours is preferred. Higher pressures and resultant higher reflux temperature require shorter reaction times.

The reaction product can be condensed directly to solid form in, for example, such condenser chambers as are employed in the manufacture of phthalic anhydride. The stilbene or derivative material can be washed with water or most hydrocarbon solvents or it can be dissolved in concentrated or absolute alcohol and be recrystallized therefrom. The recrystallized product when unsubstituted benzyl mercaptan is employed as feed stock will be trans-stilbene, which has a melting point of 124.2° C. and a boiling point of 306.5° C.

The catalyst can either be dispersed in finely divided form in the boiling reactant or it can be deposited upon supporting material such as kieselguhr, alumina, carbon or clay. A column packed with catalyst, preferably supported catalyst, can be employed and the benzyl mercaptan can either trickle over the catalyst or be passed through the column as a vapor. The relative quantity of catalyst is not critical, but preferred operating conditions require a relative quantity of catalyst dispersed in boiling liquid of at least about 0.5 part by weight of catalyst based on the weight of the reactant. The catalyst can also be dispersed in a fluidized, dense phase through which vaporized benzyl mercaptan is passed. If a packed column or a fluidized catalyst phase is employed, space velocities between about 0.1 and 10 are preferred.

When benzyl mercaptan is passed as a vapor through a packed column, the preferred temperature and pressure should be such that the stilbene which is formed will also be in vapor form. Effluent vapors from the packed tower can be passed to a condensing zone and cooled to a temperature below about 300° C. and above about 200° C. for recovery of stilbene. Vapors flowing from the stilbene recovery zone can be condensed and the condensate can be recycled to equipment for vaporizing the benzyl mercaptan.

The following specific examples, which are supplied for the purpose of illustrating the invention, demonstrate preparation of stilbene in the presence of various catalysts.

EXAMPLE I

A vessel equipped with stirring apparatus was charged with 106 parts by weight of benzyl mercaptan and 10 parts by weight of molybdenum disulfide. The vessel was fitted with a reflux condenser and apparatus for the introduction and dispersion of inert gas within the reaction zone. The reaction mixture, while being stirred, was heated at atmospheric pressure to the boiling point which, initially, was 194° C. Ammonia was bubbled through the solution throughout the course of the reaction. Boiling of the reaction mixture and refluxing of condensate was continued for a period of about two hours, during which time the reflux temperature rose to about 300° C. About one-half of the total volume of benzyl mercaptan was stripped along with the reaction product and was carried in the ammonia stream through the condenser. In commercial operation this mercaptan can be condensed and returned to the reaction zone. Solid reaction product consisting of 9 parts by weight of stilbene was recovered from the condenser; this constituted a yield of about 24.5 percent based on the converted benzyl mercaptan. Hydrogen sulfide was continually evolved during the reaction, which can be represented by the following equation:

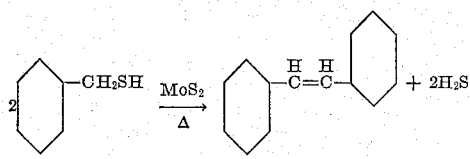

An analysis of the reaction product and the reported values for trans-stilbene are shown in the table below:

Table

|  | Observed | Literature |
|---|---|---|
| Melting point_____° C__ | 123–125 | 124 |
| Melting point of the dibromide derivative ° C__ | 235–236 | 237 |
| Hydrogen, weight_____percent__ | 6.73 | 6.67 |
| Carbon, weight_____do____ | 92.7 | 93.4 |
| Molecular weight_____ | 197 | 180 |

EXAMPLE II

Apparatus similar to that described in Example I was charged with 58 parts by weight of benzyl mercaptan and 5.0 parts by weight of copper sulfide. The benzyl mercaptan was refluxed at atmospheric pressure and at an initial temperature of 194° C. The boiling temperature gradually rose to 300° C. The mixture was stirred, nitrogen was passed slowly through the mixture and hydrogen sulfide was continuously evolved during the reaction period. The reaction product was separated as a solid from the effluent vapors. The solid condensate was dissolved in hot alcohol and filtered. Stilbene was crystallized from the filtrate and was obtained in an approximately 20 percent yield. The product had a melting-point range of 116° to 120° C. compared to a melting point of 124° C. reported in the literature for stilbene.

EXAMPLE III

Benzyl mercaptan was refluxed, in the equipment and according to the process described in Examples I and II, and in the presence of slightly over 10 percent by weight, based on the mercaptan, of cupric oxide catalyst. Nitrogen was passed through the reaction mixture and hydrogen sulfide was evolved therefrom throughout the course of the reaction. A yield of about 20 percent by weight of stilbene was obtained as condensate of the effluent vapors from the boiling mercaptan. The obtained stilbene melted in the range of 117° to 121° C.

EXAMPLE IV

Benzyl mercaptan was refluxed at an initial temperature of 194° C. in the presence of about 8.2 percent by weight, based on the mercaptan charged, of an iron sulfide catalyst. The iron sulfide was prepared from an iron ammonium sulfate salt which was reacted with ammonium sulfide to precipitate iron sulfide. Nitrogen was passed through the reaction mixture and hydrogen sulfide was evolved therefrom throughout the course of the reaction. A yield of approximately 20 percent by weight of stilbene was recovered in the manner described in the previous examples.

EXAMPLE V

Benzyl mercaptan was heated at an initial reflux temperature of about 194° C. and to a final reflux temperature of about 300° C. in the presence of about 10 percent by weight, based on the mercaptan charged, of a catalyst consisting of molybdenum oxide deposited on bauxite. Nitrogen was passed through the reaction mixture and hydrogen sulfide was evolved therefrom throughout the course of the reaction. Stilbene was obtained in a yield of approximately 20 percent.

EXAMPLE VI

Benzyl mercaptan was heated for a period of about one hour from an initial reflux temperature of 194° C. to a final temperature of about 280° C. in the presence of about 10 percent by weight, based on the mercaptan charged, of a catalyst consisting of nickel oxide deposited on kieselguhr. Nitrogen was passed slowly through the stirred reaction mixture and hydrogen sulfide was continually evolved during the course of the reaction. Stilbene vapors carried by the sweep gases were deposited in the condensing apparatus as a solid. The solid was recrystallized from alcohol and dried. The stilbene product, which was obtained in a yield of about 20 percent by weight, melted in the range of 120° to 122° C.

EXAMPLE VII

Benzyl mercaptan was refluxed from an initial temperature of about 190° C. to a final temperature of about 280° C. in the presence of about 10 percent by weight based on the mercaptan charged, of a finely divided molybdenum disulfide catalyst for a period of about one hour. Nitrogen was slowly passed through the reaction zone and hydrogen sulfide was continually evolved therefrom throughout the course of the reaction. Stilbene vapors, carried to condensing apparatus by the sweep gases, were condensed to solid form. A yield of washed stilbene of 19.3 percent by weight was obtained.

EXAMPLE VIII

Benzyl mercaptan was refluxed for a period of about two hours from an initial temperature of about 190° C. to a final temperature of about 300° C. in the presence of a catalytic amount of finely divided cobaltic sulfide. Nitrogen was passed through the reaction mixture, and hydrogen sulfide and toluene, a by-product of reaction, was removed therefrom. Stilbene was condensed in the condensing zone. The stilbene product, which was recrystallized from ethyl alcohol, melted in the range of 116–124° C.

EXAMPLE IX

Seventy-five grams of paramethoxybenzylmercaptan were refluxed from an initial temperature of about 175° C. to a final temperature of about 300° C. in the presence of about 7 percent by weight of finely divided molybdenum disulfide. Nitrogen was passed through the reaction mixture, and hydrogen sulfide was removed therefrom throughout the reaction period. The product was washed with hot ethyl alcohol to remove color bodies and then recrystallized from hot benzene. Pearl-white crystals having a melting point range of 213.5° C.–215° C. were obtained. The reported melting point ranges for 4,4′ dimethoxy stilbene are 213–214° C. and 214°–215° C.

Various methods can be employed in carrying out the present process. For example, rapid reaction can be obtained by placing the benzyl mercaptan and catalyst mixture under pressure so that boiling and reflux of the benzyl mercaptan will begin at an initial high temperature. In a preferred embodiment of this procedure the temperature can be maintained at a uniform level throughout the reaction by adjusting the pressure at the beginning so that the initial boiling temperature will be substantially the temperature of boiling stilbene at atmospheric pressure. As the reaction progresses and the concentration of stilbene in the reaction zone increases the pressure can be continually reduced to prevent increase in boiling temperature. In a similar manner any temperature above about 150° C. and below about 325° C. can be maintained throughout the reaction period. Although the foregoing examples describe a process wherein the produced stilbene is vaporized from the reaction mass during the reaction period, and although the employment of the sweep gas to remove stilbene from the reaction zone is preferred, synthesis of stilbene can be accomplished by carrying out the reaction under conditions whereby hydrogen sulfide is continually removed from the reaction zone while stilbene remains.

As hereinbefore mentioned, the product stilbene is condensed as a solid from the vapors flowing from the boiling reaction mixture. The stilbene can be condensed in large cooling chambers or it can be scrubbed from the reaction product gases with concentrated or absolute alcohol, from which the stilbene will then be crystallized.

Stilbene and its derivatives are primarily useful in the manufacture of dyestuffs and to a minor extent as pharmaceuticals and organic intermediates.

Having described my invention, I claim:

1. A process of making stilbene and stilbene derivatives comprising the steps of heating a benzyl mercaptan, having the structure:

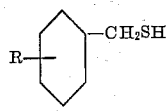

in which R is selected from the group consisting of hydrogen, alkyl and alkoxy radicals, at a temperature at least above about 150° C. in the presence of a sulfactive catalyst and separating a stilbene product from the reaction mass.

2. A process of making stilbene comprising the steps of heating a benzyl mercaptan, having the structure:

in which R is selected from the group consisting of hydrogen, alkyl and alkoxy radicals, at a temperature at least above about 150° C. in the presence of a sulfactive catalyst comprising essentially a compound of a metal selected from the group consisting of iron, cobalt, nickel, copper, silver, lead, manganese, and molybdenum and separating a stilbene product from the reaction mass.

3. A process of making stilbene comprising the steps of heating benzyl mercaptan to a reflux temperature under a pressure such that the initial reflux temperature is at least above 150° C. in the presence of a sulfactive catalyst comprising essentially a compound of a metal selected from the group consisting of iron, cobalt, nickel, copper, silver, lead, manganese, and molybdenum, refluxing the said mercaptan in the presence of the catalyst and effecting decomposition and condensation of the said mercaptan while evolving hydrogen sulfide and product vapors, and condensing stilbene from the effluent product vapors.

4. A process of making stilbene comprising the steps of heating benzyl mercaptan to a temperature between about 150° and 325° C. and at least at atmospheric pressure in the presence of 0.5 to 20 percent by weight of a sulfactive catalyst comprising essentially the sulfides of a metal selected from the group consisting of iron, cobalt, nickel, copper, silver, lead, manganese and molybdenum, refluxing the said mercaptan in the presence of the catalyst and effecting decomposition and condensation of the said mercaptan while evolving hydrogen sulfide and product vapors from the reaction mass, condensing the product vapors and recovering stilbene from the condensate.

5. A process of making stilbene comprising the steps of heating benzyl mercaptan at an initial refluxing temperature between about 150° C. and 325° C. in the presence of a sulfide of a metal selected from the group consisting of iron, cobalt, nickel, copper, silver, lead, manganese and molybdenum, refluxing the said mercaptan in the presence of the catalyst and effecting decomposition and condensation of the said mercaptan while evolving hydrogen sulfide and product vapors from the reaction mass, passing an inert gas through the said refluxing benzyl mercaptan, cooling the product vapors and condensing stilbene therefrom.

6. The process of claim 5 in which the inert gas is ammonia.

7. The process of claim 5 in which the inert gas is nitrogen.

8. A process of making stilbene comprising the steps of heating benzyl mercaptan to a boiling temperature between about 150° and 325° C., bringing at least the vapors of the boiling mercaptan into contact with between 0.5 and 15 percent by weight, based on the mercaptan, of a sulfactive catalyst comprising essentially a sulfide of a metal selected from the group consisting of iron, cobalt, nickel, copper, silver, lead, manganese and molybdenum, effecting a decomposition and condensation of the heated mercaptan while evolving hydrogen sulfide and product vapors therefrom, condensing the said product vapors, and recovering stilbene from the condensate.

LEONARD A. MATTANO.

References Cited in the file of this patent

UNITED STATES PATENTS

| Number | Name | Date |
|---|---|---|
| 2,419,198 | Bowman | Apr. 22, 1947 |

FOREIGN PATENTS

| Number | Country | Date |
|---|---|---|
| 480,756 | Great Britain | Feb. 28, 1938 |

OTHER REFERENCES

Berkman et al., "Catalysis," p. 928 (1940) pub. by Reinhold Pub. Corp., N. Y.